Patented July 20, 1943

2,324,881

UNITED STATES PATENT OFFICE 2,324,881

TETRACYCLIC COMPOUNDS AND PROCESS OF MAKING SAME

Leopold Ruzicka and Moses Wolf Goldberg, Zurich, Switzerland, assignors to Ciba Pharmaceutical Products, Incorporated, Summit, N. J.

No Drawing. Application January 22, 1941, Serial No. 375,541. In Switzerland January 17, 1940

16 Claims. (Cl. 260—586)

It has been observed that valuable tetracyclic compounds are obtained by ring extension from any desired substituted derivatives of the steroid, ring-homo- and ring-nor-steroid series containing at least one hydroaromatic ring which possesses a side chain containing a reactive, monovalent substituent attached to the carbon atom adjacent to the ring by splitting off the said monovalent substituent. [With regard to the nomenclature of: Helvetica Chimica Acta 23, 366 (1940).]

It appears that, by displacement of a ring carbon atom to the carbon atom of the side chain adjacent to the ring, a radical-like compound is formed intermediarily which, if necessary with the cooperation of the solvent, stabilizes itself by formation of a keto group, of a free or substituted hydroxyl group or of a double bond.

The parent materials may contain one or more side chains possessing reactive monovalent substituents in any desired positions of their hydroaromatic rings, for example, in the 2, 3, 6, 7, 12, 16, or 17 positions. As reactive, monovalent substituents, mention may be made of free or substituted hydroxyl, thiol or amino groups. The ring carbon atom to which is attached the side chain may carry, in addition to the side chain, hydrogen or, for example, free or substituted hydroxyl, thiol or amino groups as substituents. Furthermore, the parent substances may also contain other substituents, for instance, free or substituted hydroxyl groups, keto groups (either free or present in the form of their enol derivatives), halogen atoms, free or substituted amino groups, free or esterified carboxyl groups, and so on.

The parent substances are derivatives of the steroid series, i. e., cyclopentanopolyhydrophenanthrene compounds, or compounds which may be derived from these by ring extension (ring-homo-compounds) or ring contraction (ring-nor-compounds) of one or more of the four rings. The amines suitable for use as parent substances may be prepared from saturated or unsaturated nitriles of the steroid, ring-homo- and ring-nor-steroid series, the nitrile group of which is attached to a nucleus for instance from cyanhydrins of ring ketones. The said nitriles are treated with hydrogenating agents eventually after splitting off water. Furthermore suitable amines may be obtained by reduction of the oximes of corresponding carbonyl compounds or by degradation of acetic acid derivatives of the series mentioned. Suitable amino or halogen derivatives may also be obtained, for example, by splitting up semicyclic oxydo-compounds of the series mentioned with ammonia, amines or hydrogen halides. The latter parent materials may also be obtained from hydroxymethyl derivatives by replacement of the hydroxyl group by halogen.

In splitting off the reactive, monovalent substituents, all the methods known and described in the literature for this purpose may be used. (See, for example, Karrer, "Lehrbuch der organischen Chemie," 6th ed., pages 661 et sqq., and Tiffeneau, "Bl. Soc. Chim.," [5] 3, 1942 et sqq.) For example, for the splitting off of a halogen atom or of a thiol group, use may be made of metals, their oxides or salts, for instance, silver, lead, copper, zinc, mercury oxide, silver salts such as silver nitrate, and so on. The splitting off of a hydroxyl group may take place by heating and/or by the use of substances acting as catalysts, acid agents, such as inorganic or organic acids, also by acid anhydrides or acid halides. The splitting off of an amino group may take place by the direct splitting off of ammonia or by indirect ways, through intermediate stages which may or may not be isolated. For example, the salts of the primary amines, or of the secondary or tertiary amines which may easily be prepared therefrom by known methods, are subjected to a thermic decomposition, if desired, under diminished pressure. In the first case, the elimination of the amino group takes place with splitting off of ammonia, in the other two cases, by the splitting off of a primary or secondary amine. It is also possible to convert the amines mentioned into the corresponding quaternary ammonium bases and then to split these in known manner. Furthermore, the primary amines may be diazotized by means of nitrous acid or its derivatives; the diazo compounds which appear as intermediate products are not stable and readily split off nitrogen. The splitting off of organic acids, of alcohols or of phenols also takes place by means of agents or procedures of themselves known.

The splitting off of the reactive group takes place preponderantly by rearrangement of the tetracyclic ring structure present, that is to say, by ring extension, the carbon atom of the side chain adjacent to the ring being built into the ring system. If, for example, cyclopentanopolyhydrophenanthrene compounds are used as parent materials, and if the side chain containing the reactive group be in the ring D, the reaction product formed then possesses a ring D which has been extended to a six-ring. In this manner, derivatives of the polyhydro-chrysene series are obtained. If the side chain had been united to the ring A, B or C of the cyclopentanopolyhydrophenanthrene nucleus, the reaction products obtained contain rings with seven carbon atoms. Analogous ring extension occurs when ring-homo- or ring-nor-steroids are used as parent materials. Side chains, each of which has a reactive group attached to the carbon atom adjacent to the ring, may also be present simultaneously in several rings of the tetracyclic nucleus; in this case several rings will be extended simultaneously.

The reaction products obtained according to the present invention contain in the extended rings a newly introduced keto group, a free or substituted hydroxyl group or even a double bond, depending upon the type of the agent used and the further substituents at the ring carbon atom which carries the side chain. For example, ring-extended ketones can be obtained if the substituent named be a free or substituted hydroxyl, thiol or amino group, and ring-extended free or substituted secondary alcohols or their dehydration products if the substituent be a hydrogen atom. According to the nature of the rearrangement taking place, various structurally or stereo isomeric products may naturally be formed. Compounds formed which have double bonds may subsequently be converted into ketones in a manner of itself known, by the introduction of oxygen, for example, by way of the corresponding oxides and/or glycols. Ketones resulting or prepared in this way may be converted into secondary alcohols according to the reduction methods usual for this purpose. The latter finally may be converted into their esters, for example, their acetates, propionates, butyrates, benzoates, substituted carbonates, phthalates, or succinates in known manner by esterifying agents or into their ethers, such as their methyl, ethyl, benzyl, triarylmethyl ethers, by means of etherifying agents. If ketone groups are present—eventually in addition to hydroxyl groups—in the molecule of the new compounds, enol derivatives, viz., enol esters and enol ethers, may be obtained by the action of the esterifying or etherifying agents.

A new oxyketone, $C_{20}H_{32}O_2$, carrying the keto group in the seven-ring and the hydroxyl group in the five-ring, is obtained by the extension of the ring A of 3,17-dihydroxy-3-aminomethyl-androstane to a seven-ring according to the new process, for example, by diazotization. The amine used as starting material is itself obtainable by the hydrogenation of 3-keto-androstane-17-ole-cyanhydrin. Starting with 3,17-dihydroxy - 17 - aminomethyl - androstane, which is formed by reduction of the cyanhydrin of 3-hydroxy-androstane-17-one or by catalytic hydrogenation of the cyanhydrin of $\Delta^5$-3-hydroxy-androstene-17-one, an oxyketone, $C_{20}H_{32}O_2$, of the perhydro-chrysene series is obtained analogously, in which the keto group is situated in the ring D which is extended to a six-ring. An epimeric oxyketone may be prepared by way of the 3-epi - 17 - dihydroxy-17-aminomethylandrostane from androsterone cyanhydrin. If 3-keto-17-amino methyl-androstane be used as parent material, deamination with nitrous acid also yields an oxyketone, $C_{20}H_{32}O_2$, of the perhydrochrysene series; but this substance has the keto group situated in the ring A and the hydroxyl group in the extended ring D. In an analogous manner, for example, a six-ring alcohol of the polyhydro-chrysene series or its esters or ethers may be obtained by extension of the five-ring of unsaturated 17 - aminomethyl - androstane or -oestrane derivatives. From the corresponding 17-hydroxymethyl compounds, ring extension products having a double bond in the new extended ring are obtainable by treatment with an agent eliminating water.

The new tetracyclic compounds obtained according to the process of the invention have been proved to be very active by biological tests.

*Example 1*

100 mg. of 3,17-dihydroxy-17-aminomethyl-androstane acetate are dissolved in 2 ccm. water with the addition of some drops of glacial acetic acid, and an aqueous solution of 50 mg. sodium nitrite is added to the solution. Nitrogen is evolved. The reaction mixture is allowed to stand overnight at room temperature, when the reaction product is removed by filtering. After washing it with water, it is recrystallized several times from aqueous methyl alcohol. Lustrous flakes are obtained which melt at 193–195° C. The substance is an oxyketone of the prehydrochrysene series, $C_{20}H_{32}O_2$, which probably corresponds to the formula

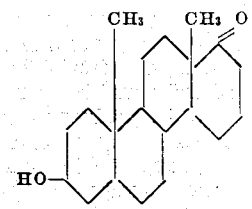

The acetate, prepared by acetylation with acetic anhydride in pyridine, melts, after recrystallization from etherpentane, at 124–126° C. The semicarbazone, prepared in the usual manner, melts at 252-254° C. after recrystallization from methanol. In a similar manner there are also obtained ethers of this hydroxy ketone such as for instance the triarylmethylether, benzylether or alkylether.

From ketones of the polyhydro-chrysene series, prepared thus or in other ways, for example, totally synthetically, after the addition of correspondingly substituted side chains, tetracyclic compounds with 3 six-rings and one seven-ring may be obtained by further ring-extension.

In order to obtain the starting material used in this example there may be proceeded as follows:

800 mg. of $\Delta^5$-3,17-dihydroxy-androstene-17-nitrile (M. P. 206° C.) are dissolved in 100 ccm. of hot glacial acetic acid and are hydrogenated with the aid of 400 mg. of platinic oxide catalyst. After 3 molecules of hydrogen have been absorbed the hydrogenation is interrupted, the solution is filtered from the catalyst, concentrated to a small volume in vacuo, diluted with water and then filtered from small quantities of insoluble substances. The clear, aqueous solution is evaporated in vacuo and the residue is dissolved in methanol. When ether is added, 3,17-dihydroxy- 17-aminomethyl-androstane acetate crystallizes in the form of fine needles, which melt with decomposition at about 220° C. In order to prepare the free amine, the acetate is dissolved in methanol and the calculated quantity of methanolic potassium hydroxide solution is added. On dilution with water, 3,17-dihydroxy-17-aminomethyl-androstane crystallizes. It may be recrystallized from methanol and then melts at 223–225° C. Yield=680 mg.=85% of theory.

By acetylation with acetic anhydride in absolute pyridine, the triacetyl derivative of 3,17-dihydroxy-17-aminomethyl-androstane is formed. After recrystallization from ether-pentane it melts at 166° C. Instead of the acyl groups there may be introduced in analogous manner also other radicals capable of being split off again by the aid of hydrolyzing agents and thus for instance other esters, such as propionates, butyrates, benzoates, or then ethers, such as triarylmethyl ethers, benzyl ethers or alkyl ethers may be obtained.

Example 2

500 mg. of 3-acetoxy-17-hydroxy-17-aminomethyl-androstane acetate are dissolved in 0.5 ccm. glacial acetic acid and 10 ccm. of water. An aqueous solution of 250 mg. of sodium nitrite is run in and the reaction mixture is allowed to stand overnight at room temperature. The reaction product which is formed with the evolution of nitrogen is filtered off, washed with water and dried. It is dissolved in benzene-petroleum ether (20:80) and the solution is filtered through a column of 16 mg. of activated aluminium oxide. The column is eluded with the same mixture of solvents and the united extracts are evaporated to dryness. The residue is recrystallized from ether-pentane, 250 mg. of the acetoxy-ketone described in Example 1, melting at 124–126° C., being obtained.

In order to obtain the starting material there may for instance be proceeded as follows:

700 mg. of $\Delta^5$-3-acetoxy-17-hydroxy-androstene-17-nitrile is dissolved in 40 ccm. of glacial acetic acid. 350 m. of platinic oxide catalyst is added, and the reaction mixture is shaken with hydrogen at room temperature. The quantity of hydrogen equivalent to 3 molecules is absorbed within 30 minutes. The solution is filtered from the catalyst, concentrated in vacuo, diluted with water, and filtered free of small quantities of insoluble impurities. The clear, aqueous solution is evaporated to dryness and the 3-acetoxy-17-hydroxy-17-aminomethyl-androstane acetate obtained is recrystallised from methanol-ether. It melts with decomposition at about 235° C. Yield is 670 mg.

If instead of from a 3-acetate there is started from a compound which in 3-position is substituted by another radical capable of being converted into a hydroxyl group by the aid of hydrolyzing agents, there are obtained in an analogous way the correspondingly substituted amines. By energetic action of esterifying or etherifying agents, respectively, these compounds may be transformed into any diesters or ester-ethers, respectively.

Example 3

400 mg. of 3-epi,17-dihydroxy-17-aminomethylandrostane acetate are dissolved in 8 ccm. water with the addition of a few drops of glacial acetic acid, and an aqueous solution of 200 mg. sodium nitrite is added. After allowing the mixture to stand overnight at room temperature, the reaction product which has been formed with evolution of nitrogen is filtered off. After drying, it is dissolved in a mixture of benzene-petroleum ether (20:80) and the solution is filtered through a column of 12 grams of activated aluminium oxide. The column is washed with the same mixture of solvents and is then eluted with benzene-ether (70:30). The benzene-ether solution is evaporated, and the residue is recrystallized from ethyl acetate and aqueous methyl alcohol, leaflets being obtained which melt at 203–305° C. The product is an oxyketone, $C_{20}H_{32}O_2$, of the probable formula

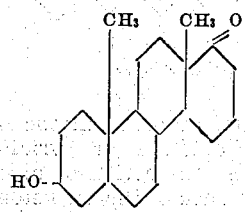

The acetate, prepared with acetic anhydride in absolute pyridine, after recrystallization from ether-pentane, melts at 151–152° C. A benzoate may also be obtained in an analogous manner. The semicarbazone obtained from the oxyketone in the usual manner may be recrystallized from methanol and then melts at about 310° C. with decomposition.

The oxyketone—or its acetate or benzoate—may be converted into the corresponding diole or its monoacetate or benzoate, for example, by the action of sodium in propyl alcohol or of hydrogen in the presence of a catalyst. These reduction products may be further esterified, and thus, for example, a diacetate or an acetate-benzoate may be obtained.

In order to obtain the starting material there may for instance be proceeded as follows:

500 mg. of 3-epi,17-dihydroxy-androstane-17-nitrile are dissolved in 30 ccm. of glacial acetic acid and are hydrogenated at room temperature after addition of 250 mg. of platinic oxide catalyst, 2 molecules of hydrogen being absorbed. The catalyst is removed by filtration, and the filtrate is worked up as described in Examples 1 and 2. The 3-epi,17-dihydroxy-17-aminomethylandrostane acetate obtained, after recrystallization from methanol-ether, melts with decomposition at about 200° C. Yield=420 mg.

The free amine, obtained from the acetate by saponification with the calculated quantity of potassium hydroxide in methanol, may be recrystallized from methyl alcohol and then melts at 206° C.

Example 4

17-aminomethyl-androstane-3-one is prepared from 3-acetoxy-allo-pregnanic-21-acid methyl ester by alkaline saponification, degradation of the free acid according to Curtis' method with intermediate protection of the hydroxyl group and subsequent oxidation of the latter according to Oppenauer's method. 500 mg. of the said amine are dissolved in 0.5 ccm. glacial acetic acid and 10 cc. water. An aqueous solution of 250 mg. sodium nitrite is run in and the reaction mixture is allowed to stand overnight at room temperature. The reaction product, which precipitates, is taken up in ether and the ether solution, after washing and drying, is evaporated to dryness. The residue is taken up in benzene-hexane (20:80) and is filtered through a column of 20 grams activated aluminium oxide. The column is washed with the same solvent mixture, then with benzene and finally with benzene-ether (80:20). The extract obtained with benzene-ether is recrystallized several times from ethyl acetate-hexane and then melts at 187-189° C. It is an oxyketone of the perhydro-chrysene series, having the probable formula

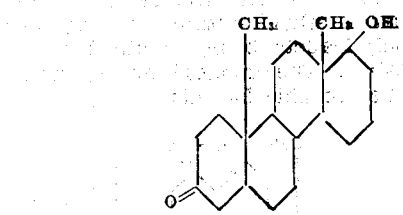

The benzoate, prepared in the usual manner with benzoyl chloride in pyridine, melts at 194–195° C. By the action of other esterifying or etherifying agents, the oxyketone also yields other monoesters or monoethers, for example, an acetate, propionate, n-butyrate, chlorocarbonate, or succinate.

The new compound proves to be highly active in the tests for male hormone action.

By reduction of its cyanhydrin, a new 3-hydroxy-3-aminomethyl compound may be obtained which, on diazotization, yields an analogous tetracyclic oxyketone having a seven-ring and three six-rings.

Example 5

200 mg. Δ⁴-17-aminomethyl-androstene-3-one, prepared from Δ⁵-3-hydroxy-pregnenic-21-acid by degradation by Curtis' method, with intermediate protection of the hydroxyl group and subsequent oxidation of the same according to Oppenauer's method, are dissolved in 4 ccm. of water by the addition of a few drops of glacial acetic acid, and an aqueous solution of 100 mg. of sodium nitrite is added. Nitrogen is evolved. The reaction mixture is allowed to stand overnight at room temperature, when the precipitated reaction product is filtered off. After washing it with water, it is fractionally crystallized from a mixture of hexane-acetone. In this manner, an oxyketone is obtained, $C_{20}H_{30}O_2$, a member of the polyhydro-chrysene series, having the probable formula

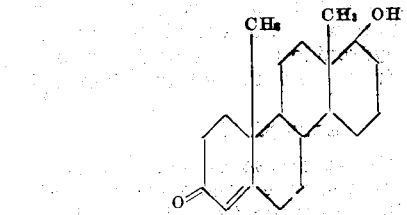

It proves to be a highly active compound of the male hormone type. By gentle action of esterifying or etherifying agents it yields monoesters or monoethers, respectively, for example, an acetate, a propionate, n-butyrate, benzoate, chlorocarbonate, succinate, triarylmethylether, benzylether, alkylether, etc. By energetic action, diesters, diethers or ester-ethers, are obtained by enolization, for example, the diacetate or the dipropionate. The 3-keto group may be converted instead of into enolesters or enolethers also into acetals or mercaptals, such as for instance into a glycolacetal, propan-1,2-diol-acetal.

Example 6

300 mg. of Δ⁵-17-aminomethyl-androstene-3-one (prepared by the degradation of Δ⁵-3-hydroxy-pregnenic-21-acid according to Curtis' method with intermediate protection of the hydroxyl group) are caused to react with nitrous acid as described in Example 5. In this manner, a diole, $C_{20}H_{32}O_2$, of the polyhydro-chrysene series is obtained having the probable formula

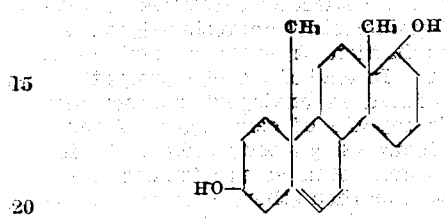

It may be converted into diesters by means of acylating agents, and these diesters by partial saponification yield monoesters with free 3-hydroxyl groups. For the preparation of monoesters with the acyl radical in the 3-position, it is advantageous to start with the corresponding Δ⁵-17-amino-methyl-3-acyloxy-androstenes. The monoesters thus available may be converted into diesters by further acylation; these diesters may also contain differing ester groups. Thus, for example, the acetate-benzoate may be obtained. In analogous manner there may also be produced ethers such as monoethers, diethers, ether-esters for instance triarylmethylethers, benzylethers, alkylethers.

Example 7

500 mg. of Δ⁴-17-hydroxymethyl-androstene-3-one are distilled in vacuo with anhydrous oxalic acid. A ketone is obtained from the reaction product by chromatography, using a column of aluminium oxide. This ketone probably conforms to the formula

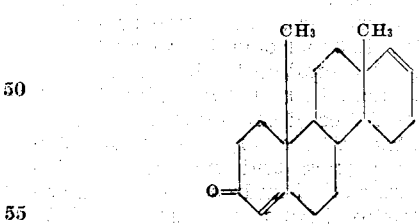

This product may also be obtained by treating the parent material for ½ hour with formic acid or by the action of phosphorous oxychloride in a tertiary amine. It is also available by the treatment of Δ⁴-17-halogenmethyl-androstene-3-one with an agent which eliminates hydrogen halide.

The doubly unsaturated ketone is taken up in ether. An excess of 10 percent of osmium tetroxide in ether is added, and the mixture is allowed to stand for 4 days, when the ethereal solution is evaporated to dryness and the residue is heated for two hours at the boil with ten times its weight of sodium sulphite in 100 times its weight of water and 50 times its weight of alcohol. The reaction mixture is then filtered at the pump, and the filtrate is extracted with chloroform. The chloroform solution yields a dioxyketone formed by the hydroxylation of the double bond in ring D. This may be converted into an unsaturated diketone of the probable formula

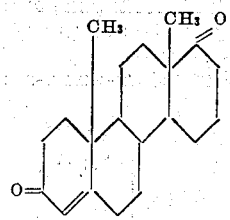

by distillation in vacuo over potassium disulphate.

The diketone may also be obtained from Δ⁴-17-hydroxymethyl-17-hydroxy-androstene-3-one by the help of dehydrating agents. This Δ⁴-17-hydroxymethyl-17-hydroxy-androstene-3-one may itself be obtained by the reduction of a Δ⁵-3,17-dihydroxy-etiocholenic acid ester with sodium in alcohol and subsequent partial oxidation in the 3-position by Oppenauer's method.

If the diketone be heated with ethyl orthoformate in benzene solution, its 3-mono-enol-ethyl ether is obtained. In a similar way, other 3-enol-ethers or even 3-acetales or -mercaptales may be obtained, for example, those derived from divalent alcohols or thioalcohols.

What we claim is:

1. A process for the manufacture of tetracyclic compounds by ring extension, which comprises reacting a compound of the steroid series which contains at least one hydroaromatic ring having in 17-position a side chain containing a reactive monovalent substituent, selected from the group consisting of amino, hydroxyl, substituted amino capable of being hydrolized to amino, and substituted hydroxyl capable of being hydrolized to hydroxyl, attached to the carbon atom adjacent the ring, with an agent capable of splitting off the said monovalent substituent.

2. A process for the manufacture of tetracyclic compounds by ring extension, which comprises reacting a compound of the steroid series which contains at least one hydroaromatic ring having in 17-position a side chain containing an amino group attached to the carbon atom adjacent the ring, with an agent capable of splitting off the said monovalent substituent, and then treating the compounds containing new secondary alcohol groups with esterifying agents.

3. A process for the manufacture of tetracyclic compounds by ring extension, which comprises reacting a compound of the steroid series which contains at least one hydroaromatic ring having in 17-position a side chain containing a substituted amino group capable of being hydrolized to amino, attached to the carbon atom adjacent the ring, with an agent capable of splitting off the said monovalent substituent, and then treating the compounds containing new secondary alcohol groups with esterifying agents.

4. A process for the manufacture of tetracyclic compounds by ring extension, which comprises reacting a compound of the steroid series which contains at least one hydroaromatic ring having in 17-position a side chain containing an hydroxyl group, attached to the carbon atom adjacent the ring, with an agent capable of splitting off the said monovalent substituent, and then treating the compounds containing new secondary alcohol groups with esterifying agents.

5. A process for the manufacture of tetracyclic compounds by ring extension, which comprises reacting a compound of the steroid series which contains at least one hydroaromatic ring having in 17-position a side chain containing a substituted hydroxyl group capable of being hydrolized to hydroxyl, attached to the carbon atom adjacent the ring, with an agent capable of splitting off the said monovalent substituent, and then treating the compounds containing new secondary alcohol groups with esterifying agents.

6. A process for the manufacture of tetracyclic compounds by ring extension, which comprises reacting a compound of the steroid series which contains at least one hydroaromatic ring which possesses in 17-position at the same carbon atom a member of the group consisting of amino, hydroxyl, substituted amino capable of being hydrolized to amino, and substituted hydroxyl capable of being hydrolized to hydroxyl, and a side chain containing a reactive monovalent substituent of the group consisting of amino, hydroxyl, substituted amino capable of being hydrolized to amino, and substituted hydroxyl capable of being hydrolized to hydroxyl attached to the carbon atom adjacent the ring, with an agent capable of splitting off the said monovalent substituent.

7. A process for the manufacture of tetracyclic compounds by ring extension, which comprises reacting a compound of the steroid series which contains at least one hydroaromatic ring having in 17-position a side chain containing a reactive monovalent substituent, selected from the group consisting of amino, hydroxyl, substituted amino capable of being hydrolized to amino, and substituted hydroxyl capable of being hydrolized to hydroxyl, attached to the carbon atom adjacent the ring, with an agent capable of splitting off the said monovalent substituent and simultaneously effecting an oxidation, then reacting the product with a reducing agent capable of transforming the new keto group into a secondary alcohol group.

8. A process for the manufacture of tetracyclic compounds by ring extension, which comprises reacting a compound of the steroid series which contains at least one hydroaromatic ring having in 17-position a side chain containing a reactive monovalent substituent, selected from the group consisting of amino, hydroxyl, substituted amino capable of being hydrolized to amino, and substituted hydroxyl capable of being hydrolized to hydroxyl, attached to the carbon atom adjacent the ring, with an agent capable of splitting off the said monovalent substituent, adding oxygen to the compounds containing new double bonds to form ketones and then treating with a reducing agent capable of transforming the new keto group into a secondary alcohol group.

9. A process for the manufacture of tetracyclic compounds by ring extension, which comprises reacting a compound of the steroid series which contains at least one hydroaromatic ring having in 17-position a side chain containing a reactive monovalent substituent, selected from the group consisting of amino, hydroxyl, substituted amino capable of being hydrolized to amino, and substituted hydroxyl capable of being hydrolized to hydroxyl, attached to the carbon atom adjacent the ring, with an agent capable of splitting off the said monovalent substituent, adding oxygen to the compounds containing new double bonds to form ketones, then treating with a reducing agent capable of transforming the new keto group into a secondary alcohol group, and finally with esterifying agents.

10. The compounds of the class consisting of the saturated D-homo-steroids and the unsaturated D-homo-steroids which contain at least one double bond starting in at least one of the positions 3, 4 and 5, and which contain only one substituent in the D-ring.

11. The compounds of the class consisting of the saturated and unsaturated D-homo-steroids of the formula

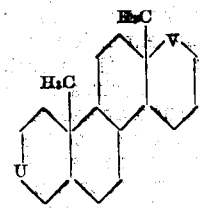

wherein U and V stand for a group containing only one oxygen atom obtainable by oxidation of a methylene group, the unsaturated compounds containing at least one double bond starting in at least one of the positions 3, 4 and 5.

12. The compounds of the class consisting of the saturated and unsaturated D-homo-steroids of the formula

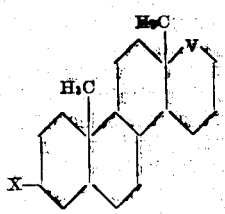

wherein X stands for a group which by hydrolysis is convertible into hydroxyl and V stands for a group containing only one oxygen atom obtainable by oxidation of a methylene group, the unsaturated compounds containing at least one double bond starting in at least one of the positions 3, 4 and 5.

13. The compounds of the class consisting of the saturated and unsaturated D-homo-steroids of the formula

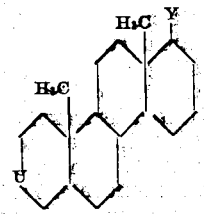

wherein Y stands for a group which by hydrolysis is convertible into hydroxyl and U stands for a group containing only one oxygen atom obtainable by oxidation of a methylene group, the unsaturated compounds containing at least one double bond starting in at least one of the positions 3, 4 and 5.

14. The unsaturated D-homo-steroids of the formula

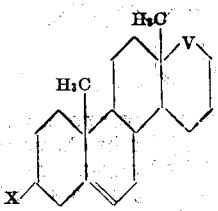

wherein X stands for a group which by hydrolysis is convertible into hydroxyl and V stands for a group containing only one oxygen atom obtainable by oxidation of a methylene group.

15. The unsaturated D-homo-steroids of the formula

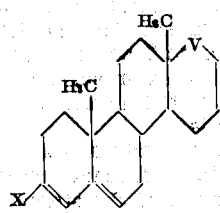

wherein X stands for a member of the group consisting of an esterified and an etherified hydroxyl group and V stands for a group containing only one oxygen atom obtainable by oxidation of a methylene group.

16. The unsaturated D-homo-steroids of the formula

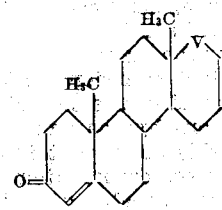

wherein V stands for a group containing only one oxygen atom obtainable by oxidation of a methylene group.

LEOPOLD RUZICKA.
MOSES WOLF GOLDBERG.